3,093,486
SALAD DRESSING
Orest J. Krett, Des Plaines, and Salvatore L. Gennuso, Elk Grove Village, Ill., assignors to National Dairy Products Corporation, New York, N.Y., a corporation of Delaware
No Drawing. Filed Feb. 6, 1961, Ser. No. 87,124
3 Claims. (Cl. 99—144)

The present invention relates generally to salad dressing, and more particularly, it relates to an emulsified salad dressing which is stable under freeze-thaw conditions.

There are various types of salad dressings and one well-known type is an emulsified salad dressing. Such a salad dressing generally comprises a mayonnaise base which is mixed with a starch base. The mayonnaise base comprises an edible liquid oil with which is mixed vinegar and an emulsifying agent, which is usually egg yolk. Suitable spices are added to the mayonnaise. The starch base comprises a starch which is cooked with water and other ingredients to provide the base. The starch may be of a type which has been treated to modify its characteristics in differing amounts and degrees.

As before indicated, the starch base is mixed with the mayonnaise base to provide an emulsified salad dressing. The resulting product, when sold as a salad dressing, comprises from about 30% fat to about 50% fat. In this connection, Federal Standards presently require that, to be sold as emulsified salad dressing, the dressing must comprise at least 30 percent fat and egg yolk solids equivalent to at least 4 percent liquid egg yolk.

However, dressings comprising substantially less than 30 percent fat and less than 4 percent egg yolk are presently marketed as "diet dressings."

When salad dressing is subjected to temperatures below the normal freezing point of water and is subsequently subjected to temperatures above the freezing point, it frequently happens that the fat phase separates from the water phase. This cycle of temperature conditions is denoted "freeze-thaw conditions" throughout this specification. Because of this emulsion instability under freeze-thaw conditions, emulsified salad dressings have not been suitable for use in various frozen food products or on sandwiches and the like which may be exposed to freeze-thaw conditions. Upon breaking of the emulsion, the dressings present an unappetizing appearance and the characteristics of the dressing are not retained.

Accordingly, it is an object of this invention to provide an improved salad dressing. A more particular object of the invention is to provide an improved emulsified salad dressing which is stable under freeze-thaw conditions. A further object of the invention is to provide an emulsified salad dressing which can be used in various frozen foods such as salads and sandwiches. Still another object of the invention is to provide an emulsified dressing which is stable under freeze-thaw conditions and which is suitable for use as a diet dressing. Other objects and advantages of the present invention will become apparent from the following disclosure.

Emulsified salad dressing, as above indicated, comprises a fat phase which is emulsified with an aqueous phase comprising vinegar and spices. While various emulsifying agents can be used in providing this emulsion, it has become more or less standard in the salad dressing field to use egg yolks as the emulsifying agent. However, such emulsifiers as lecithin, various gums, such as gum arabic, carob bean gum and gum karaya, sodium carboxy methyl cellulose, and propylene glycol esters of alginic acid can be utilized for effecting the emulsion of the fat phase with the aqueous phase. The use of these emulsifiers is within the skill of the art.

In the manufacture of emulsified salad dressing, the starch is cooked with water and is blended or mixed with a previously prepared mayonnaise emulsion. The preparation of the mayonnaise emulsion and the blending of the starch base is accomplished, in the food industry, in various types of equipment. In this connection, a Hobart unit may be employed, as well as various blenders, or similar devices.

An important features of the invention is the starch which is used in the manufacture of the starch base, i.e., the cooked starch mixture. The starch should comprise a freeze stable starch. Various starches of this character are known and are available from starch suppliers. It is necessary to utilize a starch or starches which will imbibe the water in the aqueous phase under the acid conditions present in the product, and which will retain the water when subjected to freeze-thaw conditions. Accordingly, the starch which is used in the manufacture of the starch base should be capable of retaining the water in the system so that the water does not separate out under the freeze-thaw conditions to which the emulsified dressing will be subjected.

The blend of starches is adjusted to provide the desired body to the product, while at the same time imbibing the water in the aqueous phase under freeze-thaw conditions. It is important that the water be imbibed under freeze-thaw conditions to maintain the stability of the dressing. The particular amount of starch will vary depending upon the starch used but such amount can be readily determined by subjecting the starch system to freeze-thaw conditions. Various starches which will provide such stability under freeze-thaw conditions are Amioca, modified waxy maize starches and modified tapioca starches and examples of such starches are sold under the following trade names: Col-Flo 67 and Freezist.

The chemical composition and particular physical characteristics required in varying systems of the modified starches are not available generally. However, as indicated, the starches can be obtained from starch suppliers by specifying the desired water imbibition properties under freeze-thaw conditions.

Starch blends may be utilized and it is not necessary that each starch ingredient in such a blend retain water under the freeze-thaw conditions, though the resulting gel should be freeze resistant. For example, corn starch, which is not freeze resistant, may be blended with modified waxy maize starch and modified tapioca starch, which are freeze resistant, to provide a starch gel capable of retaining water under freeze-thaw conditions.

It is often desirable to blend the starches to provide the desired body for the final salad dressing product. However, it is important that the blend provide a starch gel which it freeze resistant.

This invention contemplates the use of any emulsifying agent which is normally used in the manufacture of emulsified salad dressing. As has been previously pointed out, such emulsifying agents will usually be egg yolks. The egg yolk should be added in an amount to establish a ratio of egg yolk to oil of not less than about 0.12 (liquid yolk basis). While somewhat higher ratios of yolk than above indicated facilitate the formation of the emulsion, it has been found that an excessive amount of egg yolk does not provide particularly improved freeze-thaw stability.

In the manufacture of the emulsified salad dressing of this invention, the usual liquid, edible oils, so-called soft oils, as for example, cottonseed oil, corn oil and soybean oil, may be used.

Another important feature of the present invention is the level of oil which is present in the emulsified salad dressing. In this connection, it has been found that the salad dressing should not comprise more than about 35 percent of oil. At higher oil levels, the dressing does not have freeze-thaw stability. As indicated previously, the provision of increased amounts of egg yolk or other other emulsifying agent does not result to substantially increased freeze-thaw stability. Hence, the maximum level of oil is substantially independent of the egg yolk level, provided, of course, that the dressing contains egg yolk at a ratio to the oil in excess of about 0.12.

In the practice of the present invention, it is not essential that winterizable components of the edible oil be removed from the oil in order that a freeze stable salad dressing be obtained. However, winterized oils, such as winterized cottonseed oil, may be used at levels up to about 35 percent, a discussed above. The use of hard oil components in an emulsified salad dressing is disclosed in a pending application, entitled "Salad Dressing," filed April 11, 1960, Serial No. 21,088.

*Example I*

As a particular example of the invention, a starch base was prepared in accordance with the following formula:

| | | |
|---|---|---|
| Water | liters | 4.26 |
| Vinegar (67 grain) | do | 2.35 |
| Sugar | kilograms | 1.6 |
| Salt | do | 0.15 |
| Spices | do | 0.067 |
| Freeze resistant starch | do | 0.6 |

In the above formulation, the freeze resistant starch comprised 2.5 parts of a modified waxy maize starch sold under the trade name Col-Flo 67, 3.0 parts of Amioca starch, and 0.5 part of modified tapicoa starch sold under the trade name Freezist. This starch blend provided the desired body to the salad dressing and imbibed the water in the salad dressing under freeze-thaw conditions.

The foregoing mixture was heated to a temperature of about 193° F. in about seven minutes and was then cooled to a temperature of about 145° F.

A mayonnaise was prepared in accordance with the following formula:

| | Pounds |
|---|---|
| Frozen salted egg yolk (comprising 10% salt) | 1.9 |
| Water | 0.34 |
| Sugar | 0.15 |
| Spices | 0.0082 |
| Soybean oil (I.V. 127) | 6.82 |
| Vinegar (54 grain) | 0.734 |

The egg yolk, sugar and spices were mixed together in a Hobart mixer, and, after being blended together, the soybean oil was gradually added. After the oil was added, the speed of the Hobart unit was reduced and the vinegar was gradually added. The resulting mixture was thereafter passed through a Charlotte mill to provide desired emulsification.

10 parts of the mayonnaise were then blended with 12.8 parts of the starch base. The resulting product had a fat content of about 30 percent. The egg yolk comprised about 7.5 percent (liquid basis) of the salad dressing product of the invention, and the ratio of yolk to oil was about 0.25.

The product was frozen at minus 40° F. and stored at that temperature for two weeks, whereupon it was thawed at room temperature. It was thereupon frozen at minus 40° F. and stored for an additional week and then thawed at room temperature. After this, the product was again frozen at minus 40° F., stored for a week, and thawed at room temperature. The product, when subjected to these freeze-thaw cycles, did not break down and the water and oil phases of the product did not separate.

*Example II*

As an additional example of the preparation of the salad dressing of this invention, 10 parts of the mayonnaise described in the foregoing example were blended with 58.5 parts of the starch base described in the foregoing example. The resulting product had a fat content of about 10 percent. The yolk comprised about 2.5 percent (liquid basis) of the salad dressing, and the ratio of yolk to oil in the salad dressing was about 0.25.

The product of this example was frozen at minus 40° F., stored at that temperature for two weeks, and thawed at room temperature. It was thereupon frozen at minus 40° F. and stored for an additional week and then thawed at room temperature. After this, the product was again frozen at minus 40° F., stored for a week, and thawed at room temperature. The product, when subjected to these freezing and thawing cycles, did not break down and the water and oil phases of the product did not separate.

*Example III*

As another example of the practice of the present invention, a mayonnaise was prepared in accordance with the following formula:

| | Pounds |
|---|---|
| Frozen salted egg yolk (comprising 10% salt) | 1.51 |
| Water | 0.34 |
| Sugar | 0.15 |
| Spices | 0.008 |
| Soybean oil (I.V. 127) | 6.82 |
| Vinegar (54 grain) | 0.73 |

The foregoing ingredients were mixed and emulsified in accordance with the procedure set forth in Example I to provide the mayonnaise.

The starch base of Example I was utilized, and 10 parts of the mayonnaise were blended with 12.7 parts of the starch base. The resulting product had a fat content of about 30 percent. The egg yolk (liquid basis) comprised about 6.3 percent of the salad dressing, and the ratio of yolk to oil in the salad dressing was about 0.20.

The product was subjected to a temperature of minus 40° F. for a period of one week and thereafter thawed at room temperature. The produce was freeze stable, in that separation of the oil did not occur, and the product retained a desirable appearance.

*Example IV*

As another example of the practice of the present invention, a mayonnaise was prepared in accordance with the following formula:

| | Pounds |
|---|---|
| Frozen salted egg yolk (comprising 10% salt) | 0.88 |
| Water | 0.34 |
| Sugar | 0.15 |
| Spices | 0.008 |
| Soybean oil (I.V. 127) | 6.82 |
| Vinegar (54 grain) | 0.73 |

The foregoing ingredients were mixed and emulsified in accordance with the procedure set forth in Example I to provide the mayonnaise.

The starch base of Example I was utilized, and 10 parts of mayonnaise were blended with about 12.7 parts of the starch base. The resulting product had a fat content of about 30 percent. The egg yolk (liquid basis) comprised about 3.5 percent of the salad dressing, and the ratio of yolk to oil in the salad dressing was about 0.12.

The product was subjected to a temperature of minus 40° F. for a period of one week and thereafter thawed at room temperature. There was no separation of the oil and water phases of the salad dressing, which indicated that the product was freeze stable.

It will be seen from the foregoing description and examples that there is provided an emulsified salad dressing which is stable under extreme freeze-thaw conditions. While the exact mechanism through which this unexpected freeze-thaw stability is obtained is not entirely clear, it is thought that the following factors are important. The type and amount of starch blend which is utilized in the starch base must prevent the breakdown of the starch gel or sol into a two-phase system. The inclusion of such a starch base in a salad dressing which has a minimum ratio of egg yolk to oil, and a maximum oil content provides a dressing which has greatly improved freeze-thaw stability.

Various of the features of the present invention are set forth in the following claims.

What is claimed is:

1. An emulsified salad dressing whcih is stable against freeze-thaw conditions, comprising, in combination, an edible oil, a modified freeze resistant starch in an amount sufficient to substantially imbibe all of the moisture present in the salad dressing and retain the water under freeze-thaw conditions, and an emulsifying agent in an amount sufficient to effect emulsification, said edible oil comprising more than about 5 percent of the salad dressing and less than about 35 percent of the salad dressing.

2. An emulsified salad dressing which is stable against freeze-thaw conditions, comprising, in combination, an edible oil, a modified freeze resistant starch in an amount sufficient to substantially imbibe all of the moisture present in the salad dressing and retain the water under freeze-thaw conditions, and an emulsifying agent in an amount equivalent to egg yolk at a ratio to said edible oil in excess of about 0.12, said edible oil comprising more than about 5 percent of the salad dressing and less than about 35 percent of the salad dressing.

3. An emulsified salad dressing which is stable against freeze-thaw conditions, comprising, in combination, an edible oil, a modified freeze resistant starch in an amount sufficient to substantially imbibe all of the moisture present in the salad dressing and retain the water under freeze-thaw conditions, egg yolk at a ratio to said edible oil in excess of about 0.12, said edible oil comprising more than about 5 percent of the salad dressing and less than about 35 percent of the salad dressing.

References Cited in the file of this patent

UNITED STATES PATENTS 2,338,083    Buchanan et al. _____ Jan. 4, 1944